United States Patent [19]
Ito et al.

[11] Patent Number: 5,274,727
[45] Date of Patent: Dec. 28, 1993

[54] SECOND HARMONIC GENERATOR AND METHOD OF FABRICATION THEREOF

[75] Inventors: Kenchi Ito; Kazumi Kawamoto, both of Yokohama; Hiroshi Momiji, Zushi; Yasuo Hira, Yokohama; Hidemi Sato, Yokohama; Atsuko Fukushima, Yokohama, all of Japan

[73] Assignee: Hitachi, Ltd., Tokyo, Japan

[21] Appl. No.: 879,361

[22] Filed: May 7, 1992

[30] Foreign Application Priority Data

May 10, 1991 [JP] Japan ................................. 3-106059
May 10, 1991 [JP] Japan ................................. 3-106060

[51] Int. Cl.$^5$ .............................................. G02F 1/37
[52] U.S. Cl. .................................. 385/122; 385/129; 385/130; 359/332
[58] Field of Search ............... 385/122, 129, 130, 141, 385/142, 131, 132; 359/328, 332

[56] References Cited

U.S. PATENT DOCUMENTS

| | | | |
|---|---|---|---|
| 3,619,637 | 11/1971 | Goto .................................. | 359/328 |
| 4,240,048 | 12/1980 | Zumsteg .............................. | 359/326 |
| 4,907,850 | 3/1990 | Araki et al. ........................ | 359/332 |
| 4,971,416 | 11/1990 | Khanarian et al. .................. | 385/122 |
| 5,081,615 | 1/1992 | Sunagawa ........................... | 369/44.12 |
| 5,170,461 | 12/1992 | Yoon et al. ........................ | 385/122 |

FOREIGN PATENT DOCUMENTS

61-18934 1/1986 Japan .

OTHER PUBLICATIONS

Electronics Letters, vol. 25, No. 11, pp. 731-732, Lim et al., "Blue Light Generation . . . ", 25 May 1989.
Journal of Applied Physics, vol. 40, No. 2, pp. 720-734, Feb. 1969, DiDomenico et al., "Oxygen Octahedra . . . ".
IEEE Photonics Technology Letters, vol. 1, No. 10, pp. 316-318 1989, Oct. 1989, Webjörn et al., "Blue Light Generated by Frequency Doubling of Laser Diode . . . ".
Journal of Applied Physics, vol. 50, No. 7, pp. 4599-4603, Jul., 1979, Miyazawa, "Fecroelectric Domain Inversion . . . ".
Preliminary Transactions 27-a-p-2 for the 1990 Autumn Lecture Meeting of the Japan Applied Physics Society, 1990, Isobe et al., "Fabrication of . . . ", p. 925.
Proceedings of International Conference on Materials for Nonlinear and Electro-optics, pp. 1-6, Jul. 4-7, 1989, Cambridge, U.K., Arvidsson et al., "Periodically Domain-Inverted, . . . ".

Primary Examiner—Frank Gonzalez
Attorney, Agent, or Firm—Antonelli, Terry, Stout & Kraus

[57] ABSTRACT

A second harmonic generator having a wide acceptance of bandwidth of temperature and/or a high conversion efficiency and a method of fabrication thereof are disclosed. An equidistant arrangement of pole-inverted grating having a rectangular sectional profile and the direction of spontaneous polarization opposite to that of a substrate within an optical waveguide has been known to produce a high conversion efficiency of the second harmonic generator A second harmonic generator having such a structure, which has so far been impossible to fabricate, is formed utilizing the liquid-phase epitaxial method and the ion-implanting method. Further, the substrate and the optical waveguide are formed of the same type of material. The temperature coefficient of the refractive index in the direction perpendicular to the substrate surface is rendered substantially equal to that of the optical waveguide, thereby improving the acceptance of bandwidth of temperature and making possible practical applications of the second harmonic generator.

16 Claims, 17 Drawing Sheets

SECOND HARMONIC GENERATOR AND METHOD OF FABRICATION THEREOF

BACKGROUND OF THE INVENTION

The present invention relates to a second harmonic generator (SHG) and a method of fabrication thereof, or more in particular to a second harmonic generator of waveguide type for converting a semiconductor laser beam about 800 nm in wavelength into a blue light about 400 nm in wavelength, which is suitable as a light source for optical disk units, laser printers and other optical devices.

An improved recording density of an optical recording and reproduction apparatus and a higher resolution of a laser beam printer have been expected by shortening the wavelength of the laser beam. Nevertheless, it is not easy to reduce the semiconductor laser wavelength from 800 nm to 500 nm or less, for example, because the semiconductor of III-V group so far used with the laser is required to be changed to the semiconductor of II-VI group.

For this reason, attention has been given to a method for converting an infrared ray like a semiconductor laser beam (infrared ray) 800 nm in wavelength into a second harmonic wave 400 nm in wavelength by use of optical non-linearity.

If a second harmonic wave is to be efficiently generated by a second harmonic generator like this, it is necessary to maintain the law of energy conservation and the law of conservation of momentum between the fundamental wave and the second harmonic wave.

In view of the fact that the refractive index of an optical material generally changes with wavelength, however, there occurs the problem that the law of conservation of momentum fails to hold between different wavelengths satisfying the law of energy conservation, thereby necessitating phase matching between the fundamental wave and the second harmonic wave.

The phase matching is defined as a phenomenon in which innumerable second harmonic wave components generated in a second harmonic generator are combined with each other with the same phase during the process of propagation in an optical waveguide.

The phase matching combines the second harmonic components generated, which are outputted in such a direction as to be intensified with each other.

There are suggested several methods of phase matching.

JP-A-61-18934, for example, as shown in FIG. 1, discloses a method in which an optical waveguide 12 is formed on a $LiNbO_3$ single crystal substrate 11 by the proton exchange (a method of partially replacing Li ions of $LiNbO_3$), and a fundamental wave 13 polarized along the direction perpendicular to the substrate surface is applied from an end thereof thereby to collect a second harmonic wave 14 polarized toward the direction perpendicular to the surface of the substrate generated by the Cherenkov radiation. According to this method, the second harmonic wave is in a mode for radiation from the waveguide outward, and therefore the phase matching requirement is met.

In a method using the Cherenkov radiation described above, the second harmonic wave 14 becomes crescent in form, thereby leading to a large wave aberration, and it is almost impossible to reduce it to a minute light spot usable for optical disk devices or the like.

A method called the angle phase matching is reported in the Preliminary Transactions C-249 for the 1989 Autumn Conference of Japan Electronics Information Communication Society.

According to the angle phase matching, as shown in FIG. 2, an optical waveguide 22 is formed by liquid phase growth of lithium niobate (MgO: $LiNbO_3$) doped with magnesium on a lithium tantalate ($LiTaO_3$) substrate 21. A fundamental wave 23 polarized (TE polarization) is applied in the direction z perpendicular to the substrate surface from an end of the optical waveguide 22, and a second harmonic wave 24 polarized (TE polarization) in the direction x parallel to the substrate surface is emitted from the other end thereof.

In the process of propagation of the fundamental wave 23 through the optical waveguide 22, the nonlinearity of refractive index causes the conversion of the fundamental wave 23 to second harmonic wave components. At the same time, to the extent that the fundamental wave 23 is equal to the second harmonic wave components in propagation rate, the second harmonic wave components are always outputted while being subjected to phase matching, and therefore a maximum output of second harmonic wave is produced.

In view of the fact that the refractive index changes in proportion to the light frequency, however, the condition for phase matching described above cannot be satisfied. The condition for phase matching described above cannot be met, for example, if the fundamental wave 23 and the second harmonic wave 24 are both polarized in the direction z. As shown in FIG. 2, therefore, the second harmonic wave 24 is polarized in the direction x to use a crystal having a refractive index in the direction satisfying the condition for phase matching. In other words, the phase matching is attained by utilizing the anisotropy of crystal.

In spite of this, the use of a ferroelectric material having a large nonlinear optical coefficient like $LiNbO_3$ in the conventional method shown in FIG. 2 often makes it impossible to obtain a blue light due to an insufficient phase matching caused by dependence of refractive index on wavelength in the range of 500 nm or less of the second harmonic wave 24.

Further, the fundamental wave 23 and the second harmonic wave 24 are polarized in the directions at right angles to each other, so that the temperature coefficients of refractive index in the respective directions of polarization are considerably different from each other. As a result, the propagation rate is changed with temperature and the condition for phase matching fails to be met, so that the acceptance bandwidth of temperature is narrowed to about 0.1° C. At the same time, an unrealistic value of, say, 0.01 $\mu m$ or less would be required of the film thickness precision of the optical waveguide 22.

On the other hand, Electronics Letters, Vol. 25, pp. 731 to 732 suggests, as shown in FIG. 3, a method in which a pole-inverted layer 35 with the direction of spontaneous polarization inverted at equal pitches and an optical waveguide 32 by the proton exchange are formed on a $LiNbO_3$ substrate 31 or the like ferroelectric substance having a spontaneous polarization. A fundamental wave 33 polarized in the direction z to the substrate surface is applied from an end of the optical waveguide 32, and a second harmonic wave 34 polarized in the direction z is recovered from the other end thereof.

In this case, the intensity of the second harmonic wave components generated in the optical waveguide 32 is differentiated by the inversion of spontaneous polarization, and the length of the inversion pitch thereof is regulated thereby to subject the intensified second harmonic wave components to phase matching for recovery.

A method for generating a pole-inverted layer 35 by forming and heat-treating an $SiO_2$ or $TiO_2$ pattern on a $LiNbO_3$ single crystal substrate 41 is disclosed in The IEEE Photonics Technology Letters, Vol. 1, No. 10, 1989, pp. 316 to 318.

FIGS. 4A to 4D are diagrams showing another process of forming the pole-inverted layer 35. First, as shown in FIG. 4A, a predetermined pattern 41' of Ti layer is formed by photo-lithography on the $LiNbO_3$ substrate 41, and the Ti layer is diffused by heat treatment as shown in FIG. 4B thereby to form a Ti diffused layer 42

Miyazawa et al. report in The Journal of Applied Physics, Vol. 50, No. 7, 1979, pp. 4599 to 4603 that the Curie temperature of the Ti diffused layer 42 is reduced by about 20° to 50° C. as compared with that of the $LiNbO_3$ substrate 41 depending on the Ti concentration.

The spontaneous polarization Ps of a ferroelectric substance like $LiNbO_3$ can be expressed by equation (1), and the temperature dependence of the spontaneous polarization Ps of the single crystal substrate 41 and the Ti diffused layer 42 is given as shown in FIG. 5. It is thus seen that the Ti diffused layer 42 is smaller than the substrate 41 both in Curie temperature Tc' and magnitude of spontaneous polarization. C is a constant.

$$Ps = C\sqrt{Tc - Tc} \quad (1)$$

As a result, the heating at a temperature $T_0$ lower than the Curie temperature Tc' of the Ti diffused layer 42 induces a negative charge at the boundary between the Ti diffused layer 42 and the substrate 41 due to the difference in spontaneous polarization as shown in FIG. 4B. This electric charge generates an electric field E along the direction of arrow as shown in FIG. 4C.

When the magnitude of the electric field E exceeds a threshold level specific to a ferroelectric substance, the spontaneous polarization of the surface is inverted thereby to form a pole-inverted layer 43. This pole-inverted layer 43 is held even when the temperature is restored from $T_0$ to, say, room temperature.

The pole-inverted layer 43 is formed in extension toward the direction of the electric field E in proportion to the magnitude thereof.

The magnitude of the component of the electric field E in the direction of axis c is expressed by equation (1') below.

$$E = \frac{\Delta Ps}{\epsilon}\left(1 - \frac{d}{l}\right)\cos\theta \quad (1')$$

where $\Delta Ps$ is a spontaneous polarization difference between the $LiNbO_3$ crystal and the Ti diffused layer shown in FIG. 5, $\epsilon$ the dielectric constant along the direction of axis c of $LiNbO_3$, d the thickness of the Ti diffused layer 42, and numeral l the thickness of the substrate 41. Also, $\theta$ is the angle formed between the tangent of the boundary between the Ti diffused layer 42 and the substrate 41 and the axis c of the $LiNbO_3$ crystal.

According to the conventional method shown in FIGS. 4A to 4D, the pole inversion and internal diffusion of Ti proceed at the same time Especially, the fact that the diffusion in the direction parallel to the substrate surface (lateral diffusion) during heat treatment causes the diffused layer 42 to extend in lateral direction, and therefore the value of $\cos\theta$ around the periphery of the diffused layer 42 becomes considerably large, with the result that the pole-inverted layer 43 also extends in lateral direction Thus, as shown in FIG. 4D, pole-inverted layers are connected in the form of triangular wave.

The Preliminary Transactions 27-a-P-2 for the 1990 Autumn Lecture Meeting of the Japan Applied Physics Society reports that Nb is used instead of the $SiO_2$ or $TiO_2$ pattern mentioned above.

A device formed in the manner mentioned above, though the output light thereof is not difficult to reduce unlike the device shown in FIG. 1, has an insufficient conversion efficiency from the fundamental wave 33 to the second harmonic wave 34 due to the triangular cross section thereof.

The study by the present inventors, on the other hand, shows an acceptance bandwidth of temperature of about 3° C. which is not known. This value is larger than that (about 0.2° C.) of the device configured as shown in FIG. 2, but is not yet sufficient for practical purposes.

With regard to an improved conversion efficiency, G. Arvidssonn et al, theoretically clarified in The Proceedings of International Conference on Materials for Nonlinear and Electro-optics, pp. 1 to 6, that the conversion efficiency to a second harmonic wave is increased four times or more and the positional accuracy of a pole-inverted layer can be relaxed if the pole-inverted layer 43 in the triangular wave shape shown in FIG. 4D is changed to a rectangular grating 63 as shown in FIG. 6.

The pole-inverted portion actually obtained in the conventional methods, however, has a cross section of triangular form as shown in FIG. 3 or 4D, and a device having a pole-inverted layer in perfect rectangular shape as suggested by the theory is not known as yet.

SUMMARY OF THE INVENTION

A first object of the present invention is to provide a second harmonic generator having a large acceptance bandwidth of temperature and a method of fabrication thereof.

A second object of the present invention is to provide a second harmonic generator having a practical acceptance bandwidth of temperature and a method of fabrication thereof, and further a practical light source including the particular second harmonic generator.

A third object of the present invention is to provide a second harmonic generator high in conversion efficiency and a method of fabrication thereof.

A fourth object of the present invention is to provide a second harmonic generator with a pole-inverted layer of a shape substantially similar to but not completely coincidental with a rectangular grating and a method of fabrication thereof.

The invention provided by the present application is intended to achieve at least one of the objects described above.

Now, the acceptance bandwidth of temperature of a device obtained according to the present invention will be explained.

A perspective view of a second harmonic generator according to the present invention is shown in FIGS. 7.

In FIG. 7A, the fundamental wave 73 applied to a ridge-type optical waveguide 72 and a second harmonic wave 74 emitted from the optical waveguide 72 are both polarized in the direction perpendicular to the surface of the substrate 1 (along the direction of axis C). As a result, the present invention is applicable also to a flat surface structure as shown in FIG. 3 For facilitating the understanding, however, a second harmonic generator with the ridge-type optical waveguide 72 will be described below.

A $LiNbO_3$ single crystal thin layer 75 doped with 1 mol % MgO with a normally upward spontaneous polarization is formed on a Z cut $LiNbO_3$ single crystal substrate 71 doped with 5 mol % MgO having a +c surface. The thin layer 75 has formed thereon the optical waveguide 72 of the same material as the thin layer 75. The optical waveguide 72 has formed therein a pole-inverted grating 76 polarized in the direction (downward) opposite to the thin layer 75.

FIG. 7B is a sectional view of the optical waveguide 72 of FIG. 7A. The device shown in this diagram includes a grating-shaped pole-inverted portion 76 with a rectangular cross section for increasing the conversion efficiency like the one shown in FIG. 6.

The Journal of Applied Physics, Vol. 40, No. 2, pp. 720 to 734 carries a report of M. Didomenico Jr. et al. to the effect that inversion of the direction of spontaneous polarization inverts the sign of the nonlinear optical factor in a ferroelectric crystal belonging to the space group R3c such as $LiNbO_3$ and $LiTaO_3$. As a result, the existence of the pole-inverted grating 76 in the optical waveguide 72 inverts the nonlinear optical factor periodically. The polarization of a ferroelectric crystal is expressed as $P = X_1 E + X_2 EE$, where $X_1$ is the line as acceptability the sign of which remains unchanged with the inversion of the spontaneous polarization. $X_2$ designates the nonlinear optical factor. Thus a second harmonic wave is generated in the pole-inverted grating 76 and is polarized in the same direction as the fundamental wave. Also, the second harmonic wave components generated in respective portions of the pole-inverted grating may be combined in the same phase by appropriately setting the pitch Λ of the pole-inverted grating 76.

A study by the inventors, however, shows that the change in the refractive index due to the change in temperature at various parts in the optical waveguide 72 causes a change in the optimum pitch Λ of the pole-inverted grating 76, with the result that the condition for phase matching mentioned above fails to be met, thereby leading to the problem of a reduced conversion efficiency η. This is a new knowledge gained by the inventors.

Now, the conversion efficiency η and the condition for phase matching of the pole-inverted grating, and especially, the temperature dependence thereof will be theoretically studied to clarify the condition for improving the temperature characteristics, i.e., the acceptance bandwidth of temperature.

Equations (2) and (3) are a general expression of the electric field components in z direction of the fundamental wave 73 making up a planar wave (wavelength λ and angular velocity $\omega = 2c/\pi$) polarized in z direction in the optical waveguide 72 shown in FIG. 7A and the second harmonic wave 74 respectively.

$$E_1(x,y,z,t) = \frac{1}{2} A(y)B(x,z)[e^{i\left[\omega t - \frac{2\pi}{\lambda} N(\lambda)y\right]} + C.C.] \quad (2)$$

where A(y) is a function representing a change in the direction of propagation (y direction) of light having the amplitude of a fundamental wave.

$$E_2(x,y,z,t) = \frac{1}{2} C(y)D(x,z)[e^{i\left[\omega t - \frac{2\pi}{\lambda} N(\lambda)y\right]} + C.C.] \quad (3)$$

where C(y) is a function representing a change in the direction of propagation (y direction) of light having an amplitude of a second harmonic wave.

Also, in the equations above, N(λ), N(λ/2) and so on, designate the effective refractive index against the fundamental wave 73 and the second harmonic wave 74 in the optical waveguide 72 respectively, and c.c. a complex conjugate of the preceding exponential term.

The characters A(y) and C(y) in equation (2) and (3) designate an amplitude change in y direction (forward direction) of the fundamental wave 73 and the second harmonic wave 74 respectively and are specified by the coupling between the fundamental wave and the second harmonic wave due to the optical nonlinearity of the optical waveguide 72.

Equations (4-1) and (4-2) are the change rate in y direction of A(y) and C(y) respectively and are introduced from Maxwell's equation.

$$\frac{\partial C(y)}{\partial y} = -i \frac{2\omega^2}{N^2(\lambda)N^2\left(\frac{\lambda}{2}\right)} \left(\frac{\mu_0}{\epsilon_0}\right)^{\frac{3}{2}} |A(y)|^2 e^{i\frac{4\pi}{\lambda}\left(N\left(\frac{\lambda}{2}\right) - N(\lambda)\right)x} \times \frac{\int_{-\infty}^{+\infty}\int_{-\infty}^{+\infty} dxdz d(x,y,z)|B(x,z)|^2 D^*(x,z)}{\left[\int_{-\infty}^{+\infty}\int_{-\infty}^{+\infty} dxdz |B(x,z)|^2\right]\left[\int_{-\infty}^{+\infty}\int_{-\infty}^{+\infty} dxdz |D(x,z)|^2\right]^{\frac{1}{2}}} \quad (4-1)$$

$$\frac{\partial A(y)}{\partial y} = -i \frac{2\omega^2}{N^2(\lambda)N^2\left(\frac{\lambda}{2}\right)} \left(\frac{\mu_0}{\epsilon_0}\right)^{\frac{3}{2}} A^*(y)C(y) e^{i\frac{4\pi}{\lambda}\left(N\left(\frac{\lambda}{2}\right) - N(\lambda)\right)x} \times \quad (4-2)$$

$$\frac{\int_{-\infty}^{+\infty}\int_{-\infty}^{+\infty} dxdz d(x,y,z)|B(x,z)|^2 D^*(x,z)}{\left[\int_{-\infty}^{+\infty}\int_{-\infty}^{+\infty} dxdz|B(x,z)|^2\right]\left[\int_{-\infty}^{+\infty}\int_{-\infty}^{+\infty} dxdz|D(x,z)|^2\right]^{\frac{1}{2}}}$$

where $4\pi/\lambda(N(\lambda/2) - N(\lambda))$ making up the contents of the exponential term represents an unmatched phase amount $\Delta\beta$. Also, the integral term of equations (4-1) and (4-2) is called an overlap integral forming an important term controlling the efficiency of second harmonic generation of the device.

On the other hand, $d(x, y, z)$ designate a non-linear optical factor, which may be developed in Fourier fashion as equation (5) when the sign of $d(x, y, z)$ is inverted at pitch $\Lambda$ as in the present invention.

$$d(x,y,z) = d(x,z) \sum_{M=-\infty}^{+\infty} \frac{2}{M\pi} e^{1 \frac{2\pi}{\Lambda} My} \quad (5)$$

Also, when the period $\Lambda$ is selected as shown in equation (6) with the Fourier number of power $M = -1$, the phase matching is realized.

$$\frac{4\pi}{\lambda}\left[N\left(\frac{\lambda}{2}\right) - N(\lambda)\right] + \frac{2\pi}{\Lambda} = 0 \quad (6)$$

Even if the period $\Lambda$ is determined in the above-mentioned manner, the change in the refractive indexes $N(\lambda/2)$, $N(\lambda)$ and so on with temperature fails the condition for phase matching specified by equation (6), and $\Delta\beta$ representing the phase mismatch indicates other than zero.

The conversion efficiency from fundamental wave to second harmonic wave with $\Delta\beta$ other than zero is introduced as shown by equation (7) using Jacobian elliptic function from equations (3-1) and (3-2).

$$\eta = \frac{|C(L)|^2}{|A(O)|^2} = \mu^2 sn^2(K\sqrt{P_0}\, L\nu, k) \quad (7)$$

where $y (= sn(x, k))$ is the Jacobian elliptic function given below.

$$x = \int_0^y \frac{dy}{\sqrt{(1-y^2)(1-k^2y^2)}}$$

Also, the following relations are held:

$$\mu^2 =$$

$$\frac{1}{2}\left[\left\{2 + \left(\frac{\Delta\beta}{2K\sqrt{P_0}}\right)^2\right\} - \sqrt{\left(\frac{\Delta\beta}{2K\sqrt{P_0}}\right)^2 \left(\left(\frac{\Delta\beta}{2K\sqrt{P_0}}\right)^2 + 4\right)}\right]$$

$$\nu^2 =$$

$$\frac{1}{2}\left[\left\{2 + \left(\frac{\Delta\beta}{2K\sqrt{P_0}}\right)^2\right\} + \sqrt{\left(\frac{\Delta\beta}{2K\sqrt{P_0}}\right)^2 \left(\left(\frac{\Delta\beta}{2K\sqrt{P_0}}\right)^2 + 4\right)}\right]$$

$$k^2 = \mu^2/\nu^2_2$$
$$P_0 = |A(O)|^2$$

where $L$ is the device length, $P_0$ the power of an incident fundamental wave, and $K$ a coupling coefficient representing the conversion performance from fundamental to second harmonic wave expressed by equation (8).

$$K = \frac{2\omega^2}{N^2(\lambda)N^2\left(\frac{\lambda}{2}\right)} \left(\frac{\mu_0}{\epsilon_0}\right)^{\frac{3}{2}} \frac{2}{\pi M} \times \frac{\int_{-\infty}^{+\infty}\int_{-\infty}^{+\infty} dxdz|B(x,z)|^2 D^*(x,z)}{\left[\int_{-\infty}^{+\infty}\int_{-\infty}^{+\infty} dxdz|B(x,z)|^2\right]\left[\int_{-\infty}^{+\infty}\int_{-\infty}^{+\infty} dxdz|D(x,z)|^2\right]^{\frac{1}{2}}} \quad (8)$$

where $\omega$: Angular frequency of an incident fundamental wave $N(\lambda)$: Effective refractive index of the incident fundamental wave (wavelength $\lambda$) in the waveguide $N(\lambda/2)$: Effective refractive index of the second harmonic wave generated (wavelength $\lambda/2$) in the waveguide $\mu_0$: Permeability of vacuum $\epsilon_0$: Dielectric constant of vacuum $d$: Nonlinear optical coefficient $B(x, z)$: Amplitude distribution of electric field in the section (x-z plane) of waveguide for fundamental wave light $D(x, z)$: An amplitude distribution of electric field in the section (x-z plane) of waveguide for second harmonic wave light $M$: Odd number The elliptic function given in equation (7) can be developed into a power series as shown in equations (9-1) and (9-2) to the extent that $K\sqrt{P_0}L\nu$ is sufficiently small.

$$\eta = (C\sqrt{P_0}\ L)^2 \left[ 1 - \frac{2}{3}(1 + \right. \tag{9-1}$$

$$\left. \left(\frac{\Delta\beta}{2K\sqrt{P_0}}\right)^2 \right)(K\sqrt{P_0}\ L)^2 + \ldots \right]$$

$$\approx (K\sqrt{P_0})^2 \left[ 1 - \frac{1}{6}\Delta\beta^2 \right] \tag{9-2}$$

$$r = \frac{\alpha\text{guide}}{\alpha\text{sub}} \tag{10}$$

where

αsub: Temperature coefficient of refractive index of the substrate in the direction perpendicular to substrate surface αguide: Temperature coefficient of refractive index of optical waveguide layer in the direction perpendicular to substrate surface From equation (9-2), it is seen that the efficiency η is substantially proportional with the square of the coupling coefficient K and the incident power $P_0$ in the case where Δβ is zero with the phase matched.

In the case where phase matching is incomplete, on the other hand, the second and subsequent terms of equation (9-2) may be increased for a reduced efficiency η. Since Δβ is affected by the temperature change, the efficiency η is also influenced by temperature.

If the acceptance of change in conversion efficiency η with temperature is to expanded, therefore, it is important to employ a structure capable of producing a large conversion efficiency first of all. For this purpose, according to the present invention, a pole-inverted grating having a shape as similar to a rectangular section as possible is employed In this way, dual effects of an improved conversion efficiency η and a reduced influence of temperature change are attained.

As explained above, the advantages of the present invention have been found by theoretical analysis and detailed study of the characteristics of a second harmonic generator having a pole-inverted grating of a nonlinear optical factor as seen from equations (2) to (9).

Now, the temperature characteristic of the conversion efficiency η will be analyzed in detail to clarify the conditions for controlling the temperature change within a practical range.

In an analysis example that will be described, Z cut $LiNbO_3$ doped with magnesium of 5 mol % is used as a substrate 1, and a $LiNbO_3$ thin layer doped with magnesium of 1 mol % as an optical waveguide 4 having a thickness of 2 μm and a width of 3 μm. The fundamental wave 5 has a wavelength λ of 830 nm, and therefore the wavelength of the second harmonic wave is 415 nm. Also, the number M of power for phase matching is 1. When the input light power $P_0$ is 40 mW, the value $K\sqrt{P_0}$ in equations (7), (9) and so on is 88 $m^{-1}$.

FIG. 8 shows a temperature characteristic of the conversion efficiency η calculated from equation (7). The parameter r is the ratio between the temperature coefficient of the refractive index of the substrate in the direction (z direction) perpendicular to the substrate surface as shown in equation (10) and that of the optical waveguide in the direction perpendicular to the substrate surface. With the approach of r to unity, the conversion efficiency η is progressively less affected by temperature, while with the decrease in value r, the effect of temperature is rapidly intensified.

FIG. 9 shows the relationship between the acceptance of bandwidth of temperature ΔT when the conversion efficiency η is maintained at 80% and the temperature coefficient ratio r (equation 10) of the refractive index. It will be seen from this that the value r is required to be kept within the range of about 0.9 to 1.1 if the acceptance of bandwidth of temperature higher than 10° C. is to be obtained.

In the conventional anisotropy mode conversion shown in FIG. 2, the acceptance of bandwidth of temperature is normally about ±0.1° C. As compared with this, according to the present invention, the acceptance of bandwidth of temperature can be easily expanded by more than about 100 times up to ±10° C. with the value r set to 0.9 to 1.1 as described above.

This acceptance of bandwidth of temperature ±10° C. is a value that can be achieved with comparative ease in the case where the second harmonic generator is operated in an air-conditioned room. It is also a practically reasonable value even in an environment not air-conditioned as a simple temperature regulator can be economically used.

FIG. 10 shows the relationship between $K\sqrt{P_0}$ and the acceptance of bandwidth of temperature when r=1. From FIG. 10, it is seen that the acceptance of bandwidth of temperature increases with the increase in $K\sqrt{P_0}$. This is especially the case where the value $K\sqrt{P_0}$ is more than 10 $m^{-1}$.

As explained above, there are two reasons for great expansion of the acceptance of bandwidth of temperature.

(1) First, the temperature coefficient ratio of refractive index is very close to unity. For a conventional device of angular matching type shown in FIG. 2, for example, the ratio of temperature coefficient of the refractive index between the substrate and the optical waveguide reaches as large as 10, thereby greatly reducing the acceptance bandwidth of temperature.

(2) Secondly, the value of $K\sqrt{P_0}$ is very large As obvious from equation (7), with the increase in the value $K\sqrt{P_0}$ against the same value of Δβ, the effect of Δβ on the reduced efficiency is decreased In the conventional device shown in FIG. 3, for instance, the value $K\sqrt{P_0}$ is unity to about 5 $m^{-1}$, and therefore the acceptance of bandwidth of temperature is not very broad. In contrast, according to the present invention using a pole-inverted layer 76 with a rectangular section, the value K can be improved Further, the conversion efficiency is improved with a smaller loss, thereby making it possible to increase the value of the fundamental wave input $P_0$.

BRIEF DESCRIPTION OF DRAWINGS

These and other objects and technical advantages of the current invention will be readily apparent from the following descriptions of the preferred exemplary embodiment(s) of the invention in conjunction with the accompanying drawings, of which.

DESCRIPTION OF THE PREFERRED EMBODIMENTS

Embodiment

FIGS. 11A to 11F are diagrams showing the processes of fabrication of a second harmonic generator using the liquid phase epitaxial growth.

Figure 11A:
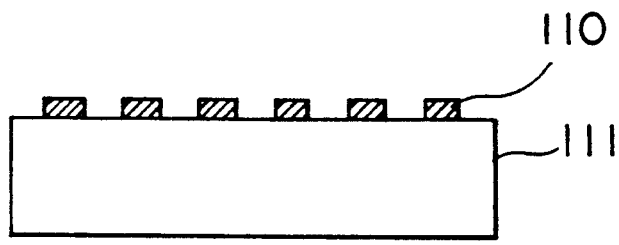
FIGS. 11A to 11F show the fabrication processes of a second harmonic generator according to a first embodiment.

First, a pole-inverted grating of the substrate is fabricated. As shown in FIG. 11A, a Ti film 110 sputtered into the thickness of 5 nm on the substrate 111 by lithography and etching, thereby producing 11 types of patterns having different pitches of 2.5 μm to 3.5 μm with 0.1 μm increments and a pattern of optimum pitch is selected as determined later from them.

Figure 11B:
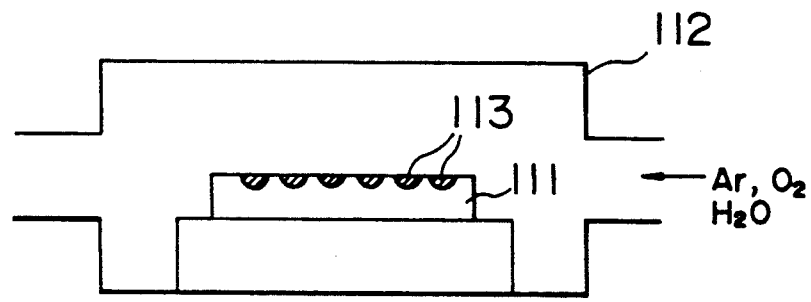

As the next step, as shown in FIG. 11B, heat treatment is conducted in a heat treatment furnace 112 at 1040° C. for 30 minutes, thereby forming a pole-inverted region 113 measuring about 1 μm. The oxygen gas and argon gas applied through pure water of 80° C. is used as an ambient gas in the heat treatment furnace 112 to prevent outward diffusion of lithium oxide.

Figure 11C:
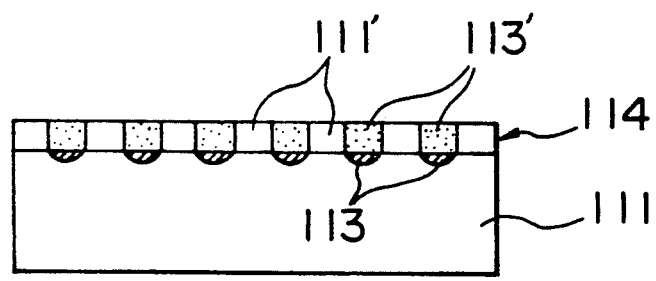

Now, as shown in FIG. 11C, a $LiNbO_3$ thin layer 114 doped with a 1 mol % MgO is formed to the thickness of 2.5 μm by epitaxial growth on a Z cut $LiNbO_3$ single crystal substrate 111 doped with 5 mol % MgO with an optically polished +c surface.

The materials of epitaxial growth used for the above-mentioned process includes powder of lithium carbonate $Li_2CO_3$, boric acid $H_3BO_3$, niobate pentoxide $Nb_2O_5$, magnesium oxide MgO and the like mixed in such a ratio that when heated and molten into uniform state in an oxygen and water vapor ambient at 1200° C. for three hours, the $LiNbO_3$ doped with 1 mol % MgO of the thin layer 114 is 20 mol % and the lithium borate $Li_2B_2O_4$ making up the flux is 80 mol %.

The above-mentioned molten substance is cooled to 800° C. at a rate of 60° C./h, and the substrate 111 with an optically-polished +c surface is immersed in it. Then, the substrate 111 is recovered from the molten substance and quenched gradually to room temperature in an electric furnace at a rate of 30° C./h, thereby forming a thin layer 114.

This thin layer 114 grows while maintaining the direction of spontaneous polarization of the substrate 111 in contact therewith. The thin layer 114, therefore, has an alternate arrangement of a first grating 111' and a second grating 113' in opposite directions. The sectional profile of each of the gratings 111' and 113' assumes a shape similar to rectangle (trapezoid or circular truncated cone) due to the isotropy of the liquid phase epitaxial growth. These sectional profiles may of course be a substantial rectangle by setting appropriate conditions.

The Mg content of the thin layer 114 is about 1 mol %. The flux material added thereto is preferably in the range of 70 to 90 mol %. The immersion time is 10 to 30 minutes for the layer thickness of 0.5 to 3 μm. The flux materials which may be used include lithium fluoride LiF, potassium fluoride KF, vanadium petroxide $V_2O_5$ or the like as well as lithium borate mentioned above.

Figure 7A:
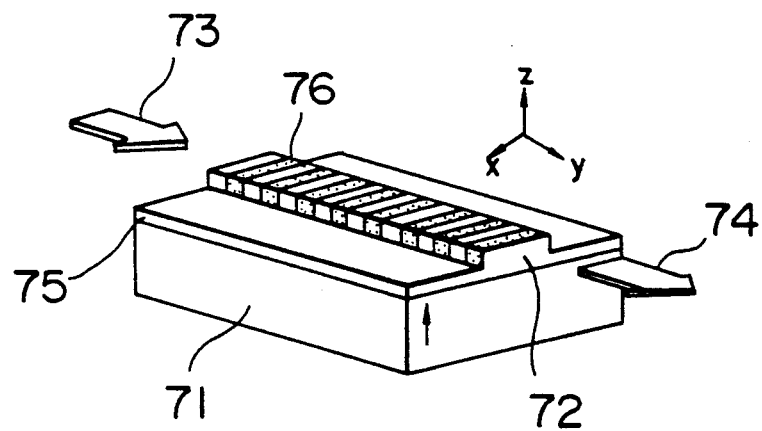
FIG. 7A is a perspective view schematically showing a structure of a second harmonic generator according to the present invention.
Figure 7B:
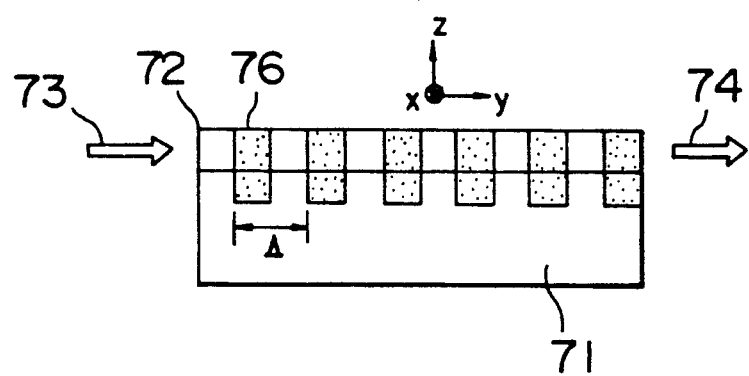
FIG. 7B is a sectional view of the same device.
Figure 11D:
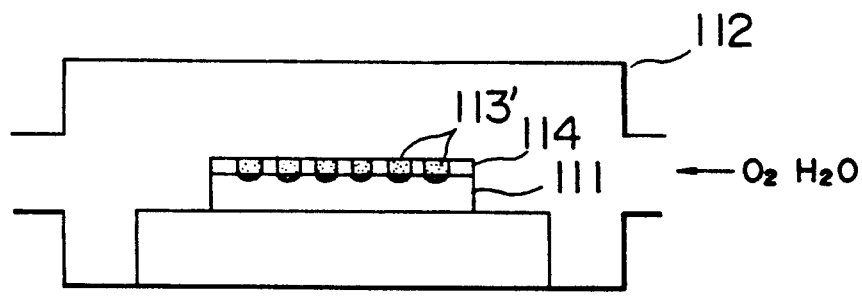
Figure 11E:
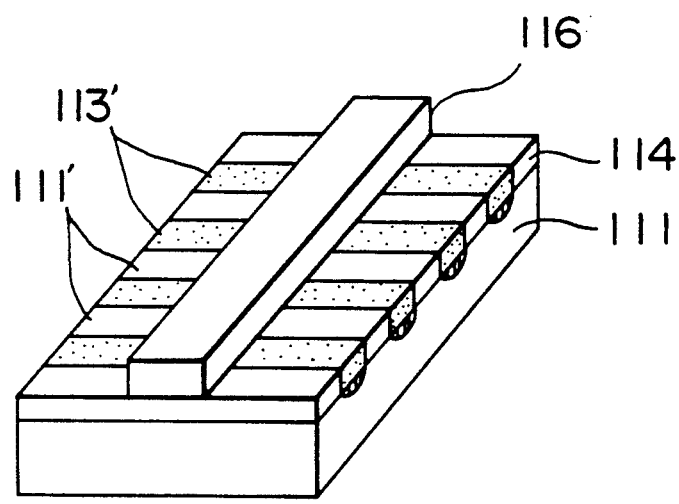
Figure 11F:
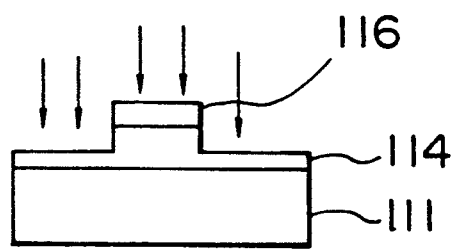

As the next step, as shown in FIG. 11D, the substrate 111 is annealed in an oxygen ambient containing water vapor to compensate for the oxygen loss, and a photoresist film 116 of 3 μm width covering the optical waveguide is formed on the thin layer 114 as shown in FIG. 11E. As seen from FIG. 11F, the thin layer is etched by 2 μm by ion milling from above the photoresist mask 116, followed by removing the photoresist thereby to fabricate an optical waveguide. Thus, a device having a structure as shown in FIG. 7 is produced. This device has polarized gratings with a shape not of a perfect rectangle but similar thereto.

In the ion-milling device described above, ions are generated in a plasma chamber having arranged therein a plurality of permanent magnets along the outer periphery of a cone-shaped hollow vacuum container and are recovered by an acceleration electrode, a deceleration electrode, a grounding electrode and the like. This configuration makes possible recovery of ions having a uniform spatial density distribution with a high directivity, thereby improving the etching accuracy.

A Pi=Sapphire laser beam having a wavelength of 830 nm polarized in the direction perpendicular to the substrate surface is applied to the optical waveguide of the device thus formed, and the effective refractive index N(λ) of TM mode having an electric field excited in the same direction is measured. The measurement is 2.1686.

A similar measurement is made by applying a pigment laser beam having a wavelength of 415 nm. Two modes are excited, and the measurement of the effective refractive index N(λ/2) for the lower-power mode is 2.3016.

The optical propagation loss of the light having a wavelength of 830 nm is 1 dB/cm. The first reason for a reduced light propagation loss is that the thin layer 114 is generated with a high quality very similar to the stoichiometric composition by the liquid phase epitaxial growth. The second reason is that the side wall of the optical waveguide is processed with a very high precision by ion milling of very high directivity.

The polarization pitch A determined from equation (5) with M as 1 using the refractive index of the second harmonic wave and the fundamental wave is about 3.1 μm. As a result, a specimen having a pitch Λ of 3.1 μm is cut out into a light wavelength of 10 mm, where a Pi=Sapphire laser beam (fundamental wave) is applied to measure the generation efficiency of the second harmonic wave. The specimen is mounted on a copper block to enable the temperature thereof to be controlled by a Peltier device.

Figure 8:
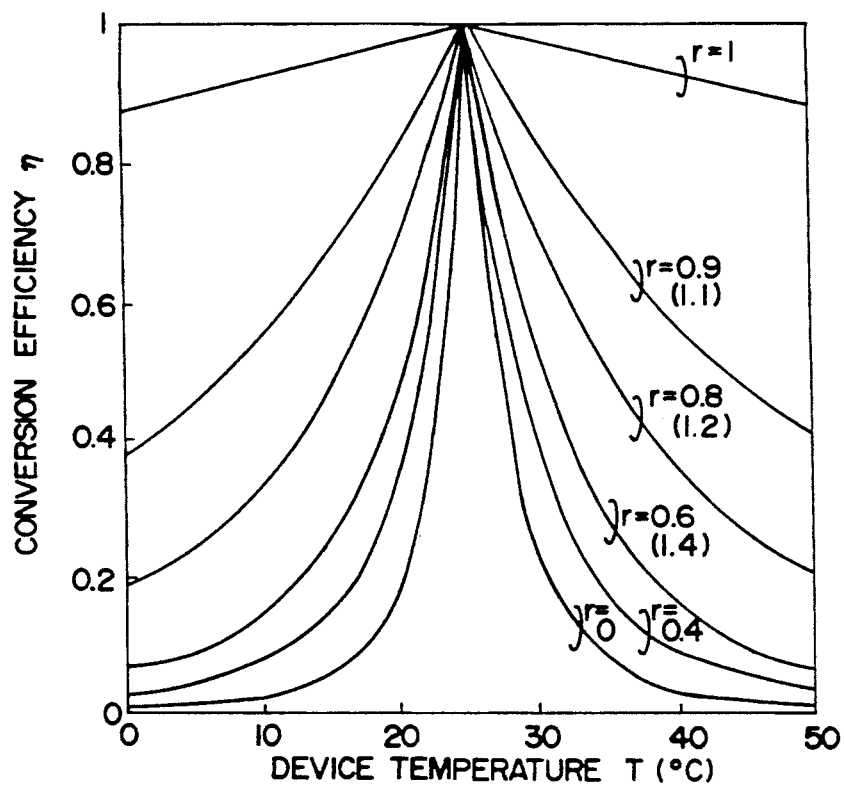
FIG. 8 is a graph showing the temperature characteristic of conversion efficiency of a second harmonic generator.
Figure 9:
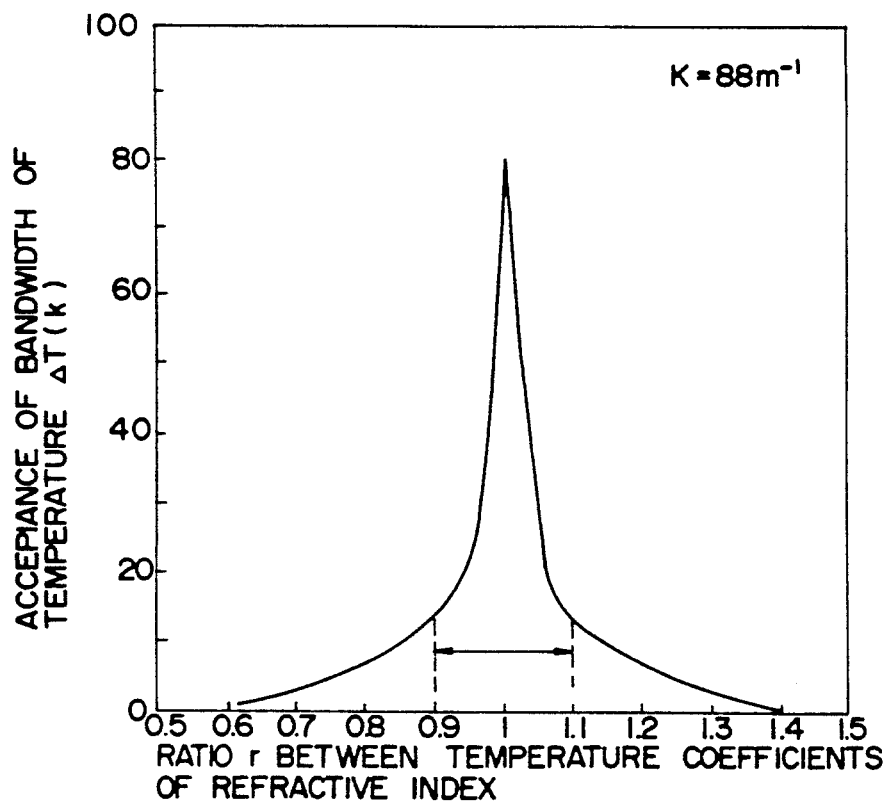
FIG. 9 is a graph showing the relationship between the ratio of refractive index to temperature coefficient of a second harmonic generator and the acceptance of bandwidth of temperature.
Figure 10:
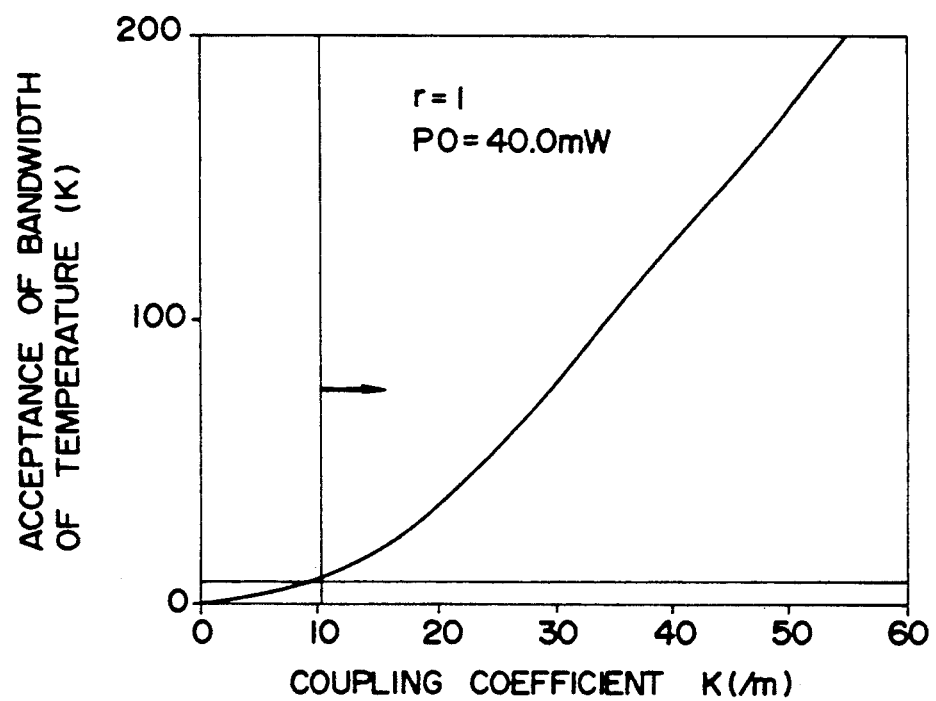
FIG. 10 is a diagram showing the relationship between the coupling coefficient and the acceptance bandwidth of temperature of a second harmonic generator according to the present invention.
Figure 12:
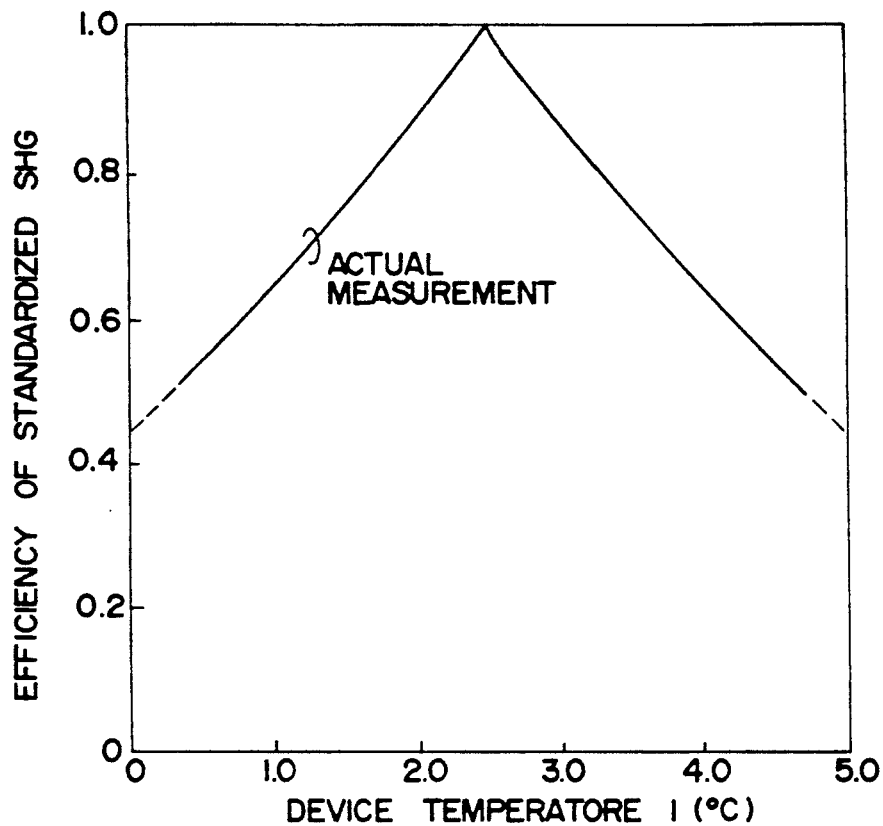
FIG. 12 is a graph showing the temperature characteristic of a second harmonic generator according to the first embodiment.

FIG. 12 shows the result of measurement of the conversion efficiency η with the substrate temperature changed by the Peltier device. The temperature width in which the conversion efficiency η is reduced to 80% is seen to be about ±10° C. around 25° C. This value, though smaller than the temperature width for r=1 in FIG. 8, is considerably larger than the value for r=0.9. The reason is considered to be that the device according to the embodiment has a substrate and an optical waveguide both made of MgO: LiNbO$_3$, that the temperature coefficient of the refractive index in the direction perpendicular to each substrate surface is substantially equal and that the value K√P$_0$ larger than for the conventional devices reduces the temperature change for the phase-matching condition specified in equation (5).

As a result, as compared with the conventional second harmonic generator, the acceptance bandwidth of temperature can be enlarged by about 100 times.

Embodiment 2

Figure 13A:
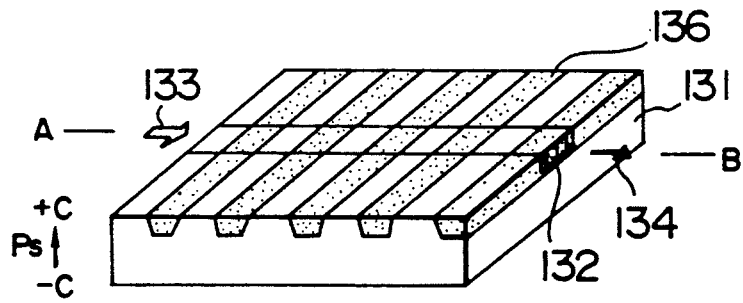
FIG. 13A is a perspective view showing a basic structure of a second harmonic wave generator according to the second embodiment.
Figure 13B:
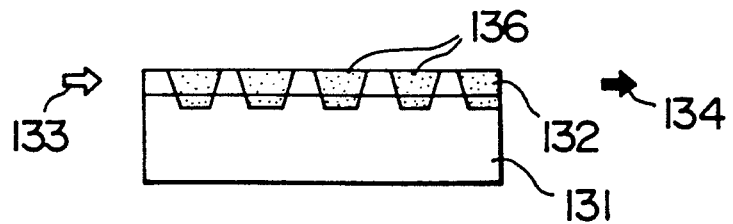
FIG. 13B is a sectional view taken along line A-B in FIG. 13A.

FIG. 13A is a perspective view showing a basic structure of a second harmonic generator according to another embodiment, and FIG. 13B a sectional view taken along line A-B in FIG. 13A.

A channel-type optical waveguide 132 fabricated by proton exchange is formed together with a pole-inverted grating 136 on the surface of a substrate 131 made of lithium niobate (LiNbO$_3$), lithium tantalate (LiTaO$_3$) or lithium tantalate niobate. Explanation will be made below with reference to a case of using lithium niobate (LiNbO$_3$) as an example.

Figure 14A:
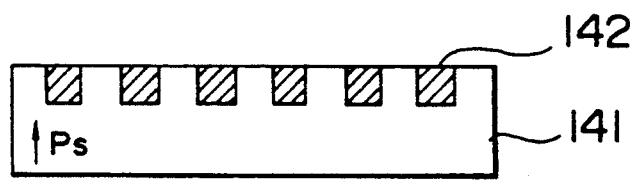
FIGS. 14A to 14C and 15A to 15G are diagrams showing the fabrication process of the device according to the second embodiment.
Figure 14B:
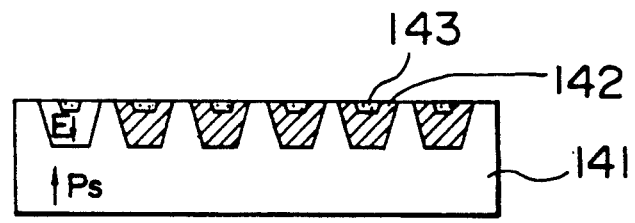
Figure 14C:
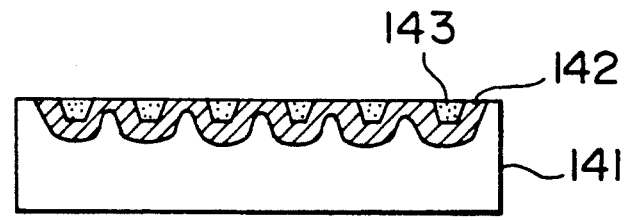

FIGS. 14A-14C shows a process for generating the pole-inverted grating 132 according to the present invention, which compares with the conventional process for generating a pole-inverted layer shown in FIGS. 4A to 4D.

FIG. 14A shows a diffusion layer 142 of impurities such as Ti formed with a rectangular section on the substrate 141 at room temperature.

FIG. 14B shows the substrate 141 being heated at a temperature lower than the Curie point. As a result of this heat treatment, the lateral diffusion of the diffusion layer 142 occurs, thereby expanding the sectional area to some degree Since the side wall is substantially perpendicular to the substrate surface, however, the value θ in equation (1') is also about 90 degree. The value of cos θ, therefore, becomes almost zero. Thus the electric field E along the direction normal to the side wall is substantially zero, with the result that the pole-inverted layer is not substantially formed in the same direction.

The bottom of the diffusion layer 142, by contrast, becomes parallel to the substrate surface. Therefore, the value θ becomes almost zero, i.e., the value cos θ is about unity, thereby maximizing the value of the electric field E along the direction normal to the bottom.

Figure 1:
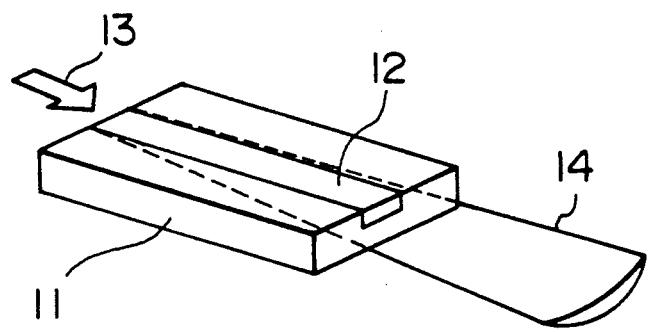
FIGS. 1 to 3 are perspective views showing conventional second harmonic generators.
Figure 2:
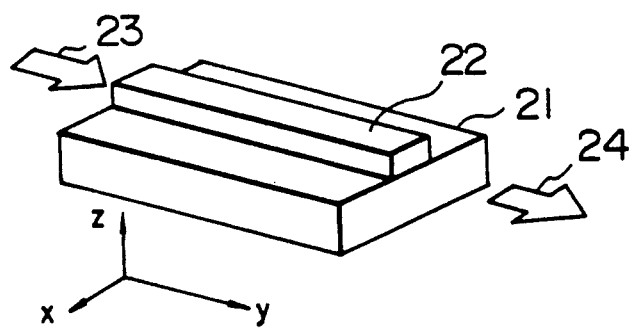
Figure 3:
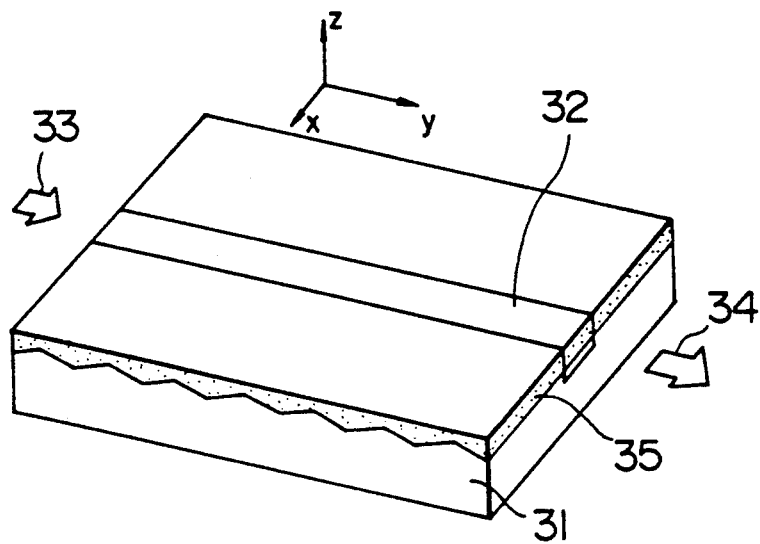
Figure 4A:
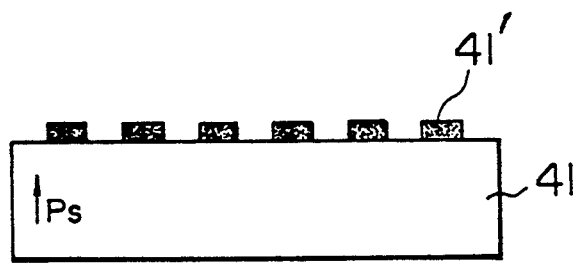
FIGS. 4A to 4D are sectional views showing a method of fabrication of the device shown in FIG. 3.
Figure 4B:
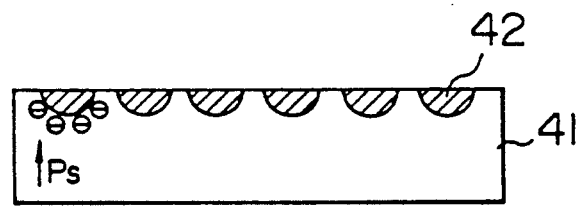
Figure 4C:
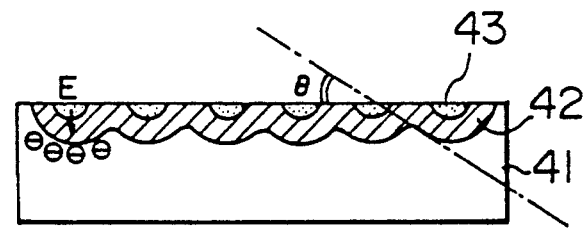
Figure 4D:
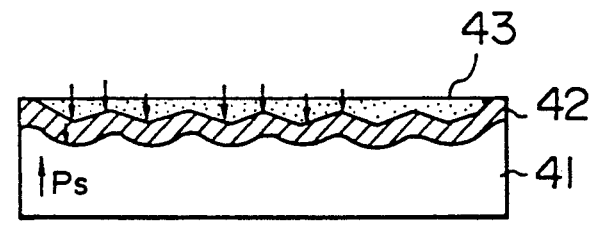
Figure 5:
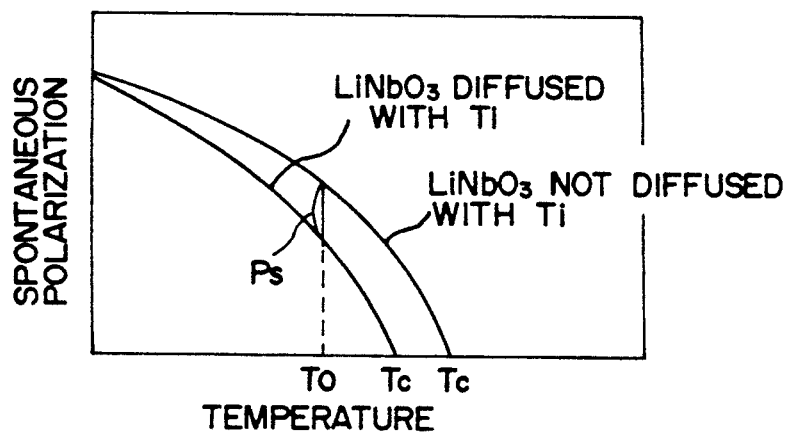
FIG. 5 is a graph showing the temperature dependency of spontaneous polarization.
Figure 6:
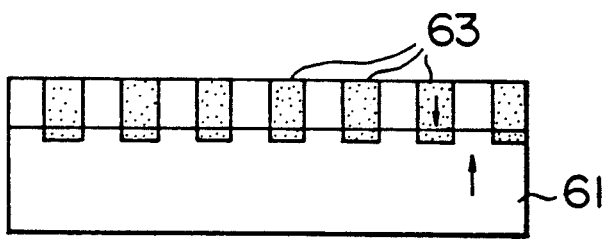
FIG. 6 is a sectional view showing a conventional second harmonic generator.

As shown in FIG. 14B, therefore, the inversion of polarization is caused only in the direction of axis c on the substrate surface. The resulting pole-inverted grating 143 grows only in the direction of axis c. Finally, therefore, mutually-isolated pole-inverted gratings with an aspect ratio of a rectangle similar to that of the initial diffusion layer 142 is formed as shown in FIG. 14C. The pole-inverted grating 143 in FIG. 14C is so similar in shape to an ideal pole-inverted grating 63 shown in FIG. 5 that the conversion efficiency from the fundamental wave to the second harmonic wave is maximized.

Now, a method of fabricating the second harmonic generator shown in FIG. 14A-14C will be described more in detail with reference to FIGS. 15A-15G.

Figure 15A:
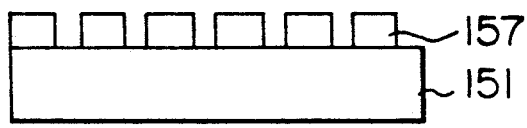

FIG. 15A shows a positive photoresist 157 formed on a Z-cut LiNbO$_3$ substrate 151 doped with 1 mol % MgO having a +c surface. This photoresist 157 is spin-coated with the thickness of 1 μm and patternized by photolithography. The ratio between line and space of the pattern is preferably in the range of 5/5 to 9/1. In this embodiment, the ratio of 7/3 is employed taking into consideration the lateral diffusion of ions during the heat treatment.

Also, in order to permit adjustment and addition of the phase of the second harmonic wave generated in each pole-inverted grating, there are prepared twenty-one types of photoresist 157 with a pattern pitch Λ varying from 2 μm to 4 μm with 0.1 μm increments.

Depending on the ion type, the photoresist 157 may be used generally as a mask material even when an alkali metal like proton is implanted or a transition metal like Ti is injected as according to the present invention to the extent that the injection energy of about 10 to 50 keV is employed.

Figure 15B:
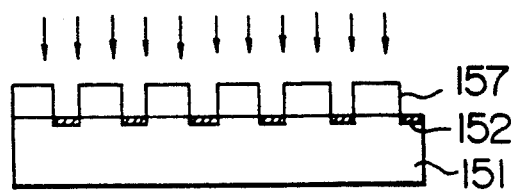

The ion used in this case may be of any type so far as it reduces the Curie temperature of the LiNbO$_3$ substrate 1. FIG. 15B refers to a case in which Ti ions are implanted to form a Ti layer 152 at room temperature. Titanium tetrachloride (TiCl$_4$) is used as an ion vapor source for an ion implanter with an injection energy of 50 keV and an injection rate of $1 \times 10^{16}$ ions/cm. The ion energy is set normally between 10 and 15 keV depending on the injection depth.

Ions are implanted in the direction of LiNbO$_3$ crystal (0001), so that the channeling phenomenon makes it possible to inject Ti ions into a rectangular form with a substantially uniform concentration to the depth of 0.2 μm.

Figure 15C:
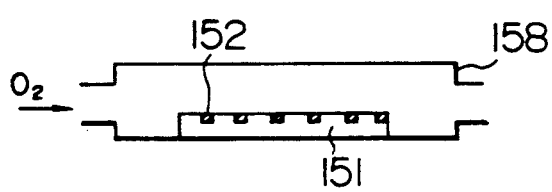

In the next step, the photoresist 157 is removed, and subjected to heat treatment for 60 minutes at a temperature of 1050° C. in a heat treatment furnace 158 as shown in FIG. 15C. This temperature is lower than the Curie point of the substrate, and depending on the ion type, normally ranges from 950° to 1100° C. The desirable temperature according to the present embodiment is 1030° to 1100° C.

The oxygen gas passed through an ion exchange solution of 80° C. is used as ambient gas to prevent the external diffusion of Li ions during the heat treatment.

Figure 15D:
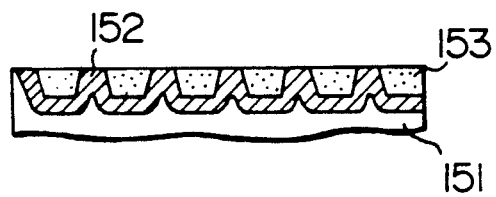

FIG. 15D is a sectional view of the substrate after heat treatment. When the substrate is cut and polished and etched in a mixture solution of fluoric acid and nitric acid, the sectional profile of the pole-inverted grating 153 becomes substantially trapezoidal as shown.

In the next step, a channel-type optical waveguide as shown in FIG. 13A is formed.

Figure 15E:
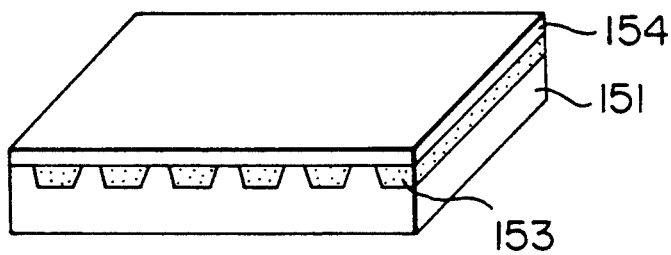
Figure 15F:
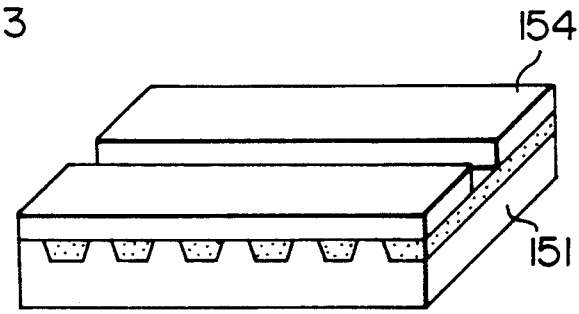

First, as shown in FIG. 15E, a Cr film 154 about 100 nm thick is formed by sputtering, and a portion 2 $\mu$m wide of the optical waveguide is etched by use of a positive photoresist mask having a spin coat thickness of 1 $\mu$m.

Figure 15G:
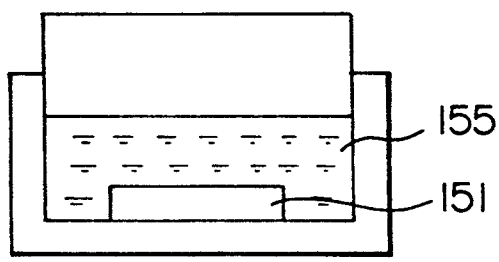

As shown in FIG. 15G, the assembly is heat treated for proton exchange in a mixture solution 155 of a weak acid with a dissociation degree of $10^{-4}$ or less and a lithium salt thereof. Benzoic acid may be used a weak acid and a 1-mol % lithium benzoate as a lithium salt of weak acid. The heat treatment is conducted for ten minutes at 230° C. After that, the assembly is recovered and cooled and the Cr film 154 is removed.

As the next step, the substrate 15 is heated for 45 minutes in the atmosphere of 400° C., thus producing a channel-type optical waveguide 3 $\mu$m in width and 2 $\mu$m in depth. With regard to the heat treatment conditions, the assembly is preferably heated for 30 to 60 minutes in the temperature range of 375° to 400° C. depending on the conditions for proton exchange.

The refractive indexes $N(\lambda)$ and $N(\lambda/2)$ of the fundamental wave and the second harmonic wave are determined from the characteristics of the second harmonic generator fabricated by the processes described above. The optimum pitch of the pole-inverted grating is calculated in accordance with equation (6). A photoresist mask having a pitch nearest to the optimum pitch is selected from among the 21 types of photoresist masks having pitches with 0.1 $\mu$m increments as prepared above, and by use of this selected photoresist mask, a second harmonic generator is fabricated.

When $N(\lambda)=2.1730$ and $N(\lambda/2)=2.3066$ are substituted into equation (6) with $M=1$, the pitch of the pole-inverted layer is about 3.1 $\mu$m. As a result, a specimen with $\Lambda=3.1$ $\mu$m is cut out into a channel length of 10 mm and both the incident and exit planes of light are polished.

Embodiment 3

Figure 16:
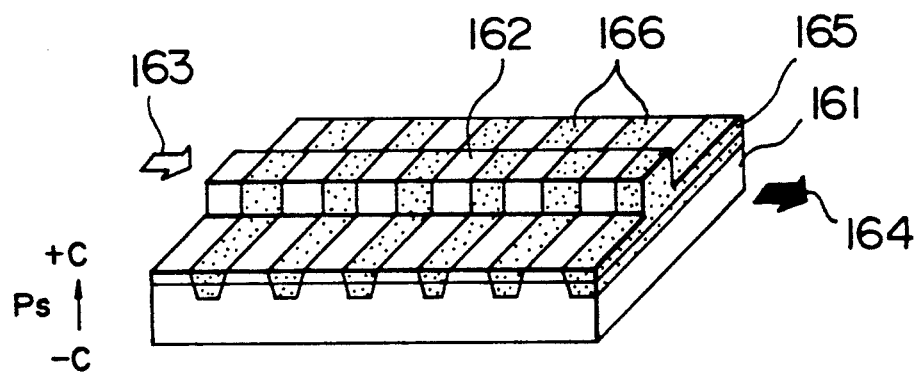
FIG. 16 is a perspective view showing a basic structure of a second harmonic generator according to a third embodiment.

FIG. 16 is a perspective view showing a second harmonic generator with an optical waveguide projected from the substrate surface according to another embodiment of the invention.

In FIG. 16, a LiNbO$_3$ single crystal thin layer 165 doped with 1 mol % MgO normally with upward spontaneous polarization is formed on a Z cut LiNbO$_3$ single crystal substrate 161 doped with 5 mol % MgO having a +c surface. A pole-inverted grating 166 with downward polarization is formed on the single crystal thin layer 165. Also, the optical waveguide 162 is protruded in ridge form from the substrate surface, and propagated while being closed in by the fundamental wave light and the second harmonic wave thereof. The incident fundamental light 163 and the second harmonic wave 164 are both polarized in the direction perpendicular to the substrate surface.

FIG. 17 shows the process for fabricating the device 16 described above. The LiNbO$_3$ single crystal thin layer 175 is subjected to epitaxial growth on the LiNbO$_3$ substrate 171.

In order to prepare a mixture of 20 mol % LiNbO$_3$ doped with 1 mol % MgO making up a material of the single crystal thin layer 175 and 80 mol % lithium borate Li$_2$B$_2$O$_4$ making up a flux material, powder of lithium carbonate Li$_2$CO$_3$, boric acid H$_3$BO$_3$, niobium petroxide Nb$_2$O$_5$ and magnesium oxide MgO in a predetermined amount are sufficiently mixed and placed in a platinaum pot and heated for three hours in an oxygen and water vapor ambience.

Figure 17A:
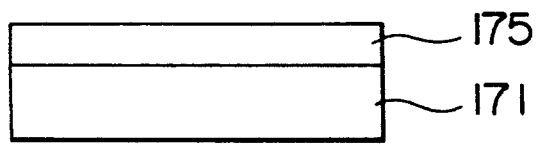
FIGS. 17A to 17G are diagrams showing the fabrication process of a second harmonic generator according to the third embodiment.

A Z cut LiNbO$_3$ single crystal substrate 171 doped with 5 mol % MgO with an optically-polished +c surface is immersed in the above-mentioned molten substance which is cooled to 800° C. at a cooling rate of 60° C./h. After that, the single crystal is cooled to room temperature at a rate of 30° C./h in an electric furnace thereby to grow a LiNbO$_3$ thin layer 175 doped with 1 mol % MgO as shown in FIG. 17A to the size of 2.5 $\mu$m.

The Mg content of the thin layer 175 is approximately 1 mol %. The amount of flux material added is preferably from 70 to 90 mol %. The length of time during which the substrate 171 is immersed in the molten substance is 10 to 30 minutes for the layer thickness of 0.5 to 3 $\mu$m depending on the thickness of the thin layer 175. Lithium fluoride LiF, potassium fluoride KF, vanadium petroxide V$_2$O$_5$ or the like, instead of lithium borate, may be used alternatively as a flux material.

Figure 17B:
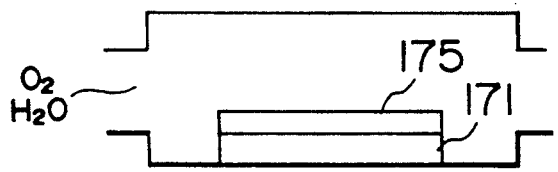

The substrate 171 with the thin layer 75 deposited thereon is then annealed in an oxygen ambient containing water vapor as shown in FIG. 17B thereby to compensate for oxygen loss.

Figure 17C:
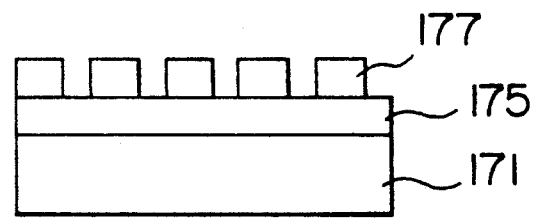

As the next step, as shown in FIG. 17C, a photoresist 177 is spin-coated with a thickness of 1 $\mu$m on the thin layer 175, and is subjected to window patterning at the pole-inverted portion by normal photolithographic technique.

Figure 17D:
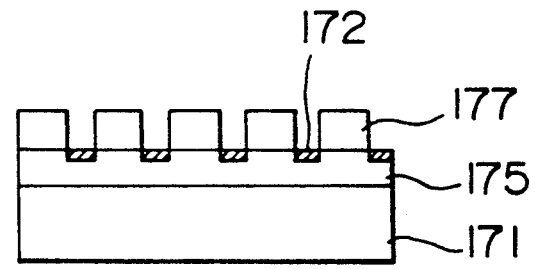

Then as shown in FIG. 17D, Ti ions are implanted at room temperature to form a Ti injected portion 172 in rectangular shape. In place of Ti, alkali metal, transition metal or the like which can reduce the Curie point of the LiNbO$_3$ substrate 171 may be used.

The line-space ratio of this pattern is set to 7/3 taking into account the lateral diffusion of the Ti injected portion 172 during the subsequent heat treatment. The line-space ratio is preferably in the range of 5/5 to 9/1 depending on the heat treatment temperature.

Titanium tetrachloride (TiCl$_4$) is used as an ion vapor source of a Ti ion implanter, and the injection energy thereof is set to 50 KeV. This injection energy, depending on the injection depth, is between 10 and 150 KeV.

Ions are implanted in the (0001) direction of the LiNbO0$_3$ crystal substrate 171 so that Ti ions are injected substantially uniformly to the depth of 0.2 $\mu$m by the channeling phenomenon. The rate of Ti ion injection is $1\times10^{16}$ ions/cm$^2$.

Figure 17E:
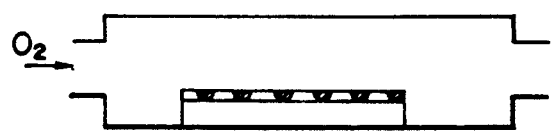

As the next step, as shown in FIG. 17E, in order to dampen the external diffusion of Li ions, heat treatment is conducted for 60 minutes at 1050° C. in an ambient of oxygen gas passed through an ion exchange solution of 80° C. after removal of the photoresist 177 thereby to form a pole-inverted grating 173.

Depending on the impurities injected, the heat treatment temperature is preferably between 950° and 1100° C., or in particular between 1030° and 1100° C. somewhat lower than 1150° C. which is the Curie temperature of Ti, alkali metal, transition metal or the like.

Figure 17F:
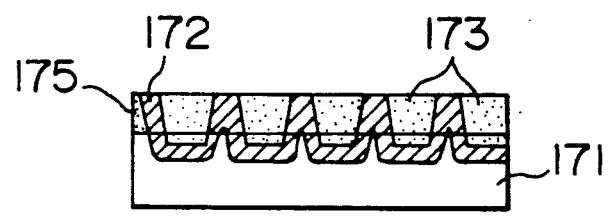

FIG. 17F is a sectional view of a pole-inverted grating 173 obtained by cutting and polishing the substrate along the direction of the optical waveguide after being cooled and by etching in a mixture solution of fluoric acid and nitric acid. It will be seen that the sectional profile of the pole-inverted grating 173 is formed substantially in rectangular shape.

Figure 17G:
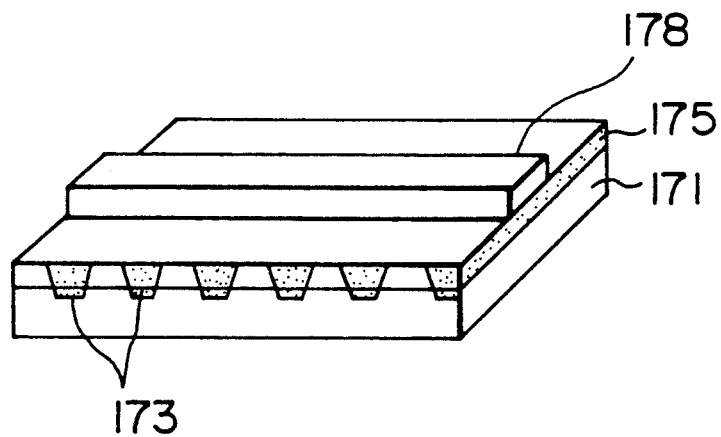

As shown in FIG. 17G, by use of a photoresist mask having a spin-coat thickness of 1 μm, the portions of the thin layer 175 other than the optical waveguide are etched by about 2.0 μm, and the photoresist 178 is removed, thereby forming a channel-type optical waveguide in ridge form having a width of 3 μm and a depth of 2.0 μm.

The refractive indexes $N(\lambda)$ and $N(\lambda/2)$ of the fundamental wave and the second harmonic wave respectively are determined from the characteristics of the second harmonic wave generator prepared by the processes described above, and the optimum pitch of the pole-inverted grating 173 is calculated in accordance with equation (6). A photomask nearest in optimum pitch is selected from among the 21 types of photoresist masks having different pitches with 0.1 μm increments prepared as above. By use of this particular photoresist mask, a second harmonic generator is finally produced and the efficiency thereof is checked.

When $N(\lambda)=2.1686$ and $N(\lambda/2)=2.3016$ are substituted into equation (6) with $M=1$, the pitch $\Lambda$ of the pole-inverted layer is about 3.1 μm. As a result, a specimen with $\Lambda=3.1$ μm is cut out to a channel length of 10 mm and the light-incident and exit surfaces thereof are polished appropriately.

Embodiment 4

A method of fabrication according to still another embodiment is shown in FIGS. 18A-18F.

Figure 18A:
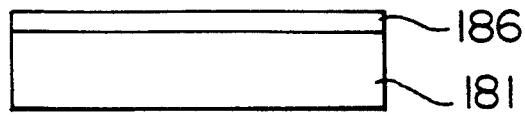
FIGS. 18A to 18F are diagrams showing the fabrication process of a second harmonic generator according to a fourth embodiment.

As shown in FIG. 18A, a Cr film 186 is formed to a thickness of about 100 nm by sputtering on a LiNbO$_3$ substrate 1 doped with 5 mol % MgO.

Figure 18B:
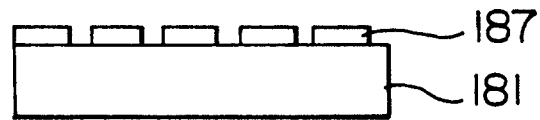

As shown in FIG. 18B, the Cr film 186 is patterned by photolithography. For this purpose, a photoresist spin-coated to a thickness of about 1 μm is patterned to form a pattern of 8/20 in line-space ratio and a pattern pitch of 2 to 4 μm. This photoresist is then used as a mask to etch the Cr pattern. There are prepared 21 types of patterns having pitches varying in 0.1 μm increments.

Figure 18C:
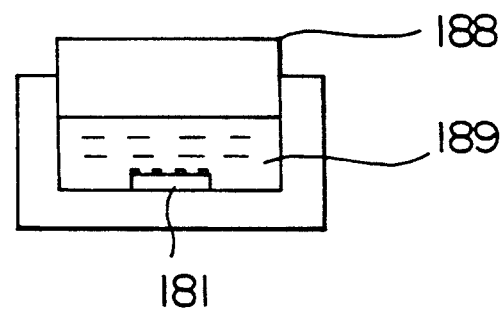

As shown in FIG. 18C, benzoic acid with 1 mol lithium benzoate added thereto is placed and heated and molten in a quartz container 188, and the substrate is immersed in the resulting solution 189. The solution 89 is 160° C. in temperature and the immersion time is 10 minutes.

Figure 18D:
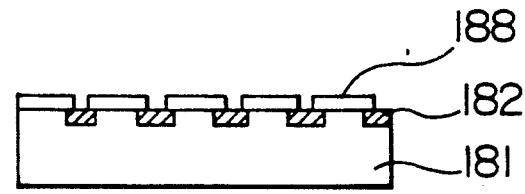

As a result, as shown in FIG. 18D, a proton exchange layer 182 is formed to a depth of about 0.1 μm.

Figure 18E:
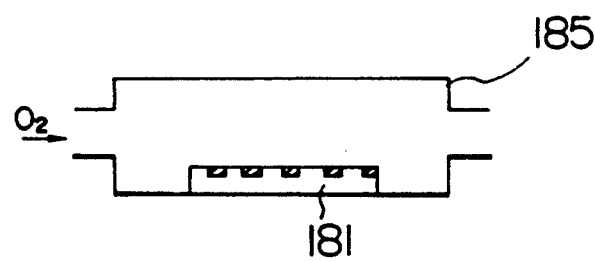
Figure 18F:
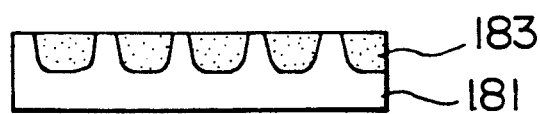

Then, the Cr film 188 is removed, and as shown in FIG. 18E, heat treatment is conducted in the heat treatment furnace 185 for 60 minutes at 1035° C. A pole-inverted layer 183 having a depth of about 3 μm is formed in a shape similar to rectangle as shown in FIG. 18F. The temperature of heat treatment is preferably between 950° and 1100° C., and an oxygen gas passed through an 80° C. ion exchange solution is used as an ambient. External diffusion of Li$_2$O is prevented by using this oxygen gas.

As in Embodiment 2, a proton exchange optical waveguide is formed. The efficiency of a second harmonic generator prepared in this way is substantially equal to that of the device prepared according to Embodiment 1.

In preparing the second harmonic generator shown in FIG. 16, it is necessary to fabricate a pole-inverted grating after forming a thin layer crystal.

According to the second to fourth embodiments described above, it is possible to form an impurities injection portion rectangular in sectional profile at a substrate or a thin crystal portion of lithium niobate, lithium tantalate, lithium tantalate-niobate or any of these substances doped with magnesium. By heating this substance at a temperature lower than the Curie point, therefore, a pole-inverted grating with the direction of polarization opposite to that of the substrate and having a sectional profile substantially rectangular or similar thereto is formed with the direction of spontaneous polarization along the normal of the substrate surface, thereby improving the conversion efficiency by more than one digit as compared with the conventional second harmonic generator.

An application of a second harmonic generator fabricated by the method according to the above-mentioned embodiments will be described below.

Figure 19:
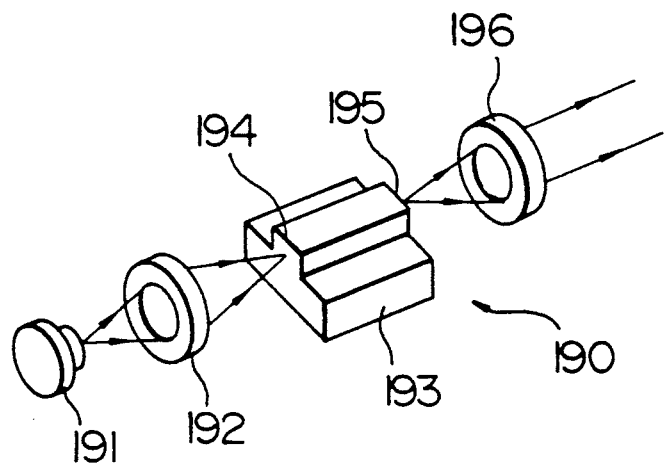
FIG. 19 is an exploded perspective view for explaining the structure of a small-sized visible light source installed in one of the second harmonic generators according to the above-mentioned embodiments.

FIG. 19 shows a small-sized visible light source incorporating the device. In FIG. 19, a laser beam from a large-output semiconductor laser source 191 having an output of about 100 mW and a wavelength of 830 nm is condensed at an end surface of an optical waveguide of a second harmonic generator 193 by a lens system 192. A second harmonic wave having a wavelength of 415 nm is issued from an emission surface 195 and arranged into parallel beams by a collimating lens system 196. The incident surface 194 is coated with an anti-reflection film, and the emission surface with a substance for cutting the fundamental wave having a wavelength of 830 nm.

Figure 20:
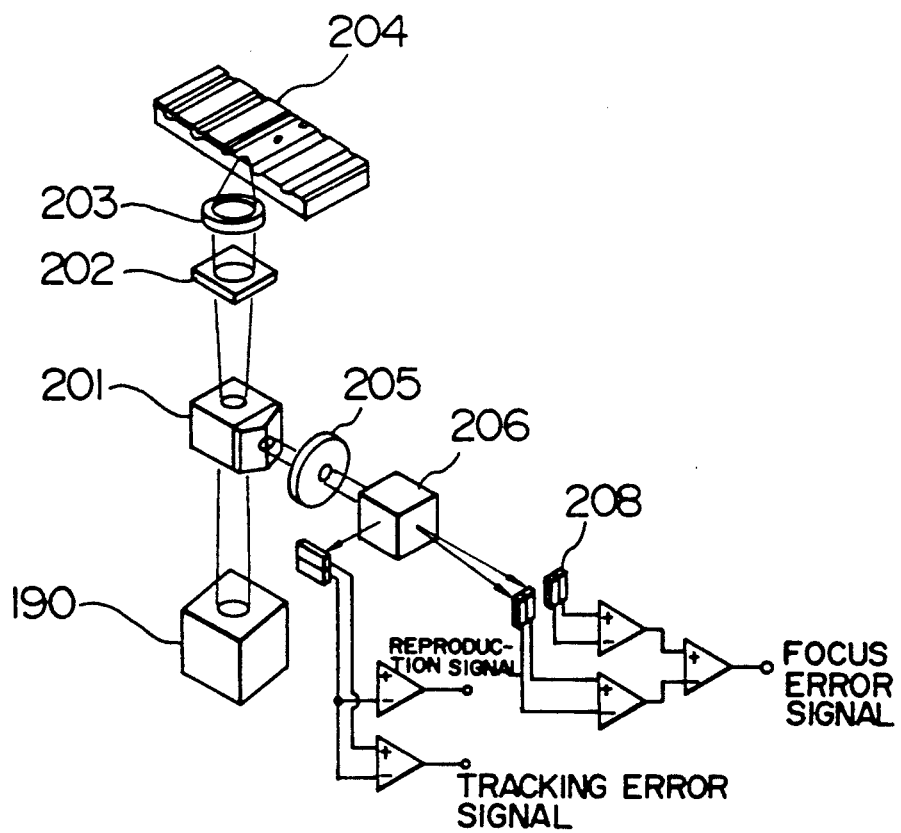
FIG. 20 is a diagram showing the structure of a head for a write-once type optical disk having the light source shown in FIG. 19.

FIG. 20 is a diagram showing a structure of an example of a head for a once-write type optical disk including the visible light source 190 shown in FIG. 19.

The light emitted from the small-sized visible light source 190 is transmitted through a polarization beam splitter 201, circularly polarized by a λ/4 wavelength plate 202, and is condensed at an optical disk 201 by an objective lens 203. The light reflected from the optical disk 204 is reflected by the polarization beam splitter 201, condensed by a condenser 205 and split by half through a half mirror 206. One of the light beams thus split is led by a one-half photosensor 207 and is converted into a tracking error signal for the optical disk. The remaining one of the light beams is introduced to a one-fourth photosensor 208 and converted into a focusing error signal and a reproduction signal.

Figure 21:
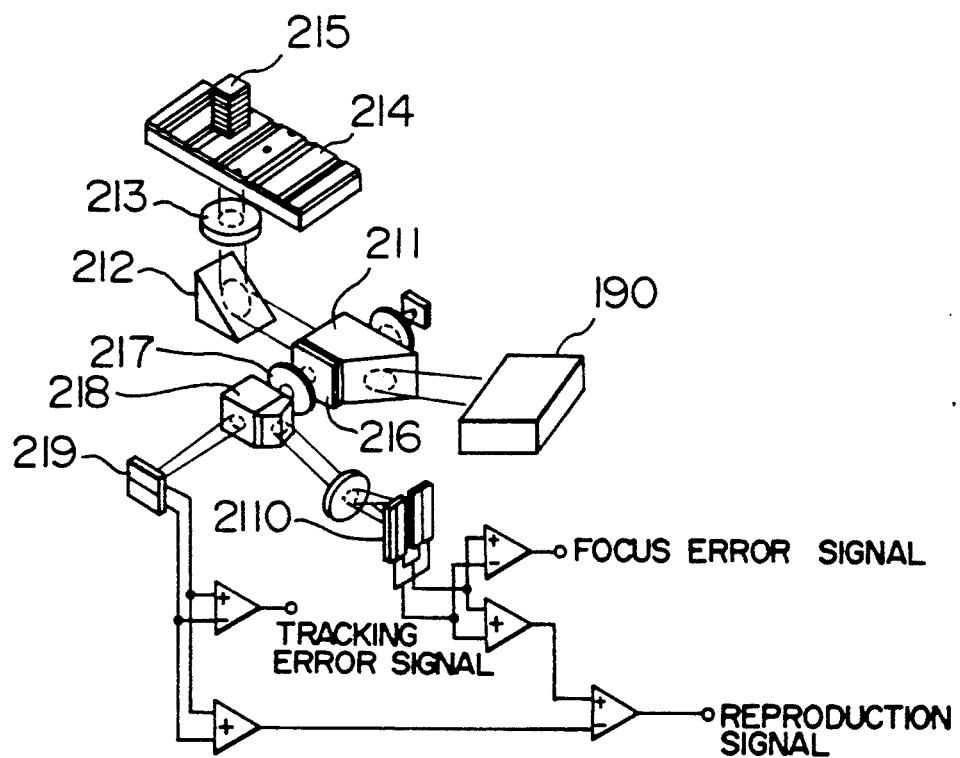
FIG. 21 is a diagram showing the structure of a head for an optical magnetic disk having the light source shown in FIG. 19.

FIG. 21 is a diagram showing a structure of an example of the head for a magneto-optic disk having the visible light source 190 shown in FIG. 19.

The light emitted from the visible light source 190 is passed through a polarization beam splitter 211, raised at a reflection prism 212, and is condensed on an optical disk 214 at an objective lens 213. Numeral 215 designates a write/erase magnetic coil. The light beam reflected from a disk surface 214 is reflected on the polarization beam splitter 211, condensed by a condenser 217 through a λ/2 wavelength plate 216, and split by one half through a polarization beam splitter 219. One of the light beam portions thus split is applied to a one-half photosensor 219 and converted into a tracking error signal. The other half of the light beam is led to a one-fourth photosensor 2110 and converted into a focusing error signal and a magneto-optic reproduction signal.

The visible light source 190 may be applied also to a reproduction-only optical disk or a phase-change type optical disk by appropriately changing the head optical system.

Figure 22:
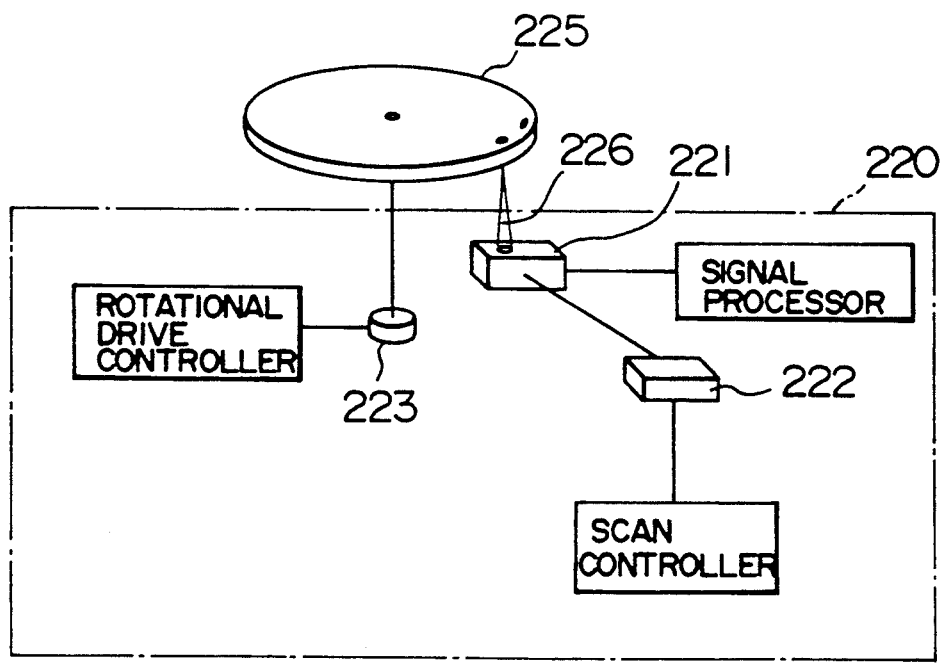
FIG. 22 is a diagram schematically showing the structure of an optical recording and reproducing apparatus using the head shown in FIG. 20 or 21.

FIG. 22 is a schematic diagram showing a structure of an optical information recording and reproduction system 220 using the optical head shown in FIG. 20 or 21.

An optical head 221 mounted on an actuator 222 processes a signal by converting optical information from an optical recording medium 225 into an electrical signal.

According to this optical information recording and reproduction system, a blue light beam generated by a harmonic generator according to the present invention may be used, and the spot size on the disk can be reduced to 0.5 μm, so that the recording density is improved by four times as compared with the conventional system. Also, the temperature variations of the second harmonic generator is so small that the temperature control system indispensable for the conventional system is eliminated. Further, according to the invention, the system is simplified and economized while at the same time reducing the size and weight of the optical head thereby to shorten the access time.

We claim:

1. A second harmonic generator comprising:
   a substrate; and
   an optical waveguide for converting a fundamental wave to a second harmonic wave, the optical waveguide having a refractive index higher than that of said substrate, the optical waveguide being located at a surface of the substrate;
   wherein a ratio r between (a) the temperature coefficient of the refractive index of the substrate in a direction perpendicular to the substrate surface and (b) the temperature coefficient of the refractive index of said optical waveguide in the direction perpendicular to the substrate surface, is substantially equal to unity.

2. A second harmonic generator according to claim 1: wherein said ratio r ranges from 0.9 to 1.1.

3. A second harmonic generator according to claim 1: wherein said ratio r is 1.0.

4. A second harmonic generator according to claim 1: wherein said optical waveguide, in a direction along a length of the waveguide, includes a plurality of units each having a first portion with a first direction of spontaneous polarization and a second portion with a second direction of spontaneous polarization opposite to the first direction of spontaneous polarization, said units being arranged periodically with substantially a same width in the direction along the length of the waveguide.

5. A second harmonic generator according to claim 4: wherein said second portion has a substantially rectangular sectional profile in the direction along the length of the waveguide.

6. A second harmonic generator according to claim 5: wherein said first portion and said second portion have substantially a same width in the direction along the length of the waveguide.

7. A second harmonic generator according to claim 1: wherein said substrate is formed of lithium niobate doped with magnesium, and said optical waveguide is formed of a material selected from the group consisting of (a) lithium niobate and (b) lithium niobate doped with magnesium in an amount smaller than the amount of magnesium doped in said substrate.

8. A second harmonic generator according to claim 1, wherein the optical waveguide is on the substrate.

9. A second harmonic generator according to claim 1, wherein the optical waveguide is in the substrate.

10. A second harmonic generator according to claim 1, wherein the optical waveguide is in a ridge extending on the substrate.

11. A second harmonic generator according to claim 1, wherein the substrate includes a thin layer, and wherein the optical waveguide is provided on the thin layer and includes a pole-inverted grating polarized in a direction opposite to a polarization direction of the thin layer.

12. A light source system comprising:
   a light source for emitting a coherent light; and
   a second harmonic generator including:
   a substrate and
   an optical waveguide for converting a fundamental wave of said coherent light to a second harmonic wave, the optical waveguide having a refractive index higher than that of said substrate, the optical waveguide being located at a surface of the substrate;
   wherein a ratio r between (a) the temperature coefficient of the refractive index of the substrate in a direction perpendicular to the substrate surface and (b) the temperature coefficient of the refractive index of said optical waveguide in the direction perpendicular to the substrate surface, is substantially equal to unity;
   said second harmonic generator further comprising a lens system for condensing said coherent light emitted from said light source onto said second harmonic generator.

13. A light source system according to claim 12: wherein said ratio r ranges from 0.9 to 1.1.

14. A light source system according to claim 12: wherein said coherent light is a laser beam having a wavelength of 780 nm to 1100 nm.

15. A method of generating a second harmonic wave by use of a second harmonic generator comprising a substrate and an optical waveguide located at a surface of the substrate, said optical waveguide including, in a direction along a length of the optical waveguide, a plurality of units each having a first portion with a first direction of spontaneous polarization and a second portion with a second direction of spontaneous polarization opposite to the first direction of spontaneous polarization, said units being arranged periodically with substantially a same width in the direction along the length of the optical waveguide, said method comprising the steps of:
   securing a value $K\sqrt{P_0}$ of at least 10 m$^{-1}$, where $P_0$ is the power of a fundamental wave entering said second harmonic generator, and K is a coupling coefficient representing the performance of converting said fundamental wave into a second harmonic wave,
said coupling coefficient K being expressed as $$K = \frac{2\omega^2}{N^2(\lambda)N^2\left(\frac{\lambda}{2}\right)} \left(\frac{\mu_0}{\epsilon_0}\right)^{\frac{3}{2}} \frac{2}{\pi M} \times \frac{\int_{-\infty}^{+\infty}\int_{-\infty}^{+\infty} dxdzd|B(x,z)|^2 D^*(x,z)}{\left[\int_{-\infty}^{+\infty}\int_{-\infty}^{+\infty} dxdz|B(x,z)|^2\right]\left[\int_{-\infty}^{+\infty}\int_{-\infty}^{+\infty} dxdz|D(x,z)|^2\right]^{\frac{1}{2}}}$$

where
$\omega$: Angular frequency of the incident fundamental wave,
$N(\lambda)$: Effective refractive index of incident fundamental wave light (wavelength $\lambda$) in waveguide,
$N(\lambda/2)$: Effective refractive index of the generated second harmonic wave light (wavelength $\lambda/2$) in waveguide,
$\mu_0$: Magnetic permeability of vacuum,
$\epsilon_0$: Dielectric constant of vacuum,
d: Nonlinear optical factor,
B(x, z): Amplitude distribution of electric fielding waveguide section (x-z plane) of fundamental wave light,
D(x, z): Amplitude distribution of electric fielding waveguide section (x-z) plane of second harmonic wave light, and
M: Odd number; and
converting light of the fundamental wave into light of the second harmonic wave, in the optical waveguide.

16. A method according to claim 15:
wherein said second harmonic generator has a ratio r substantially equal to unity between (a) a temperature coefficient of the refractive index of the substrate in a direction perpendicular to the substrate surface and (b) a temperature coefficient of the refractive index of said optical waveguide in the direction perpendicular to the substrate surface.

* * * * *